United States Patent [19]
Hackett

[11] Patent Number: 5,410,558
[45] Date of Patent: Apr. 25, 1995

[54] VARIABLE SHORT PERIOD ELECTRON BEAM WIGGLER FOR FREE ELECTRON LASERS

[75] Inventor: Kirk E. Hackett, Albuquerque, N. Mex.

[73] Assignee: The United States of America as represented by the Secretary of the Air Force, Washington, D.C.

[21] Appl. No.: 158,669

[22] Filed: Nov. 29, 1993

[51] Int. Cl.⁶ .................................................. H01S 3/00
[52] U.S. Cl. .......................................... 372/2; 372/37; 372/73; 505/180
[58] Field of Search ...................... 372/2, 73, 32; 505/1

[56] References Cited

U.S. PATENT DOCUMENTS

| | | | |
|---|---|---|---|
| 4,438,513 | 3/1984 | Elias et al. | 372/2 |
| 4,466,101 | 8/1984 | Schoen | 372/2 |
| 4,542,510 | 9/1985 | Black, Jr. | 372/2 |
| 4,599,724 | 7/1986 | McMullin | 372/2 |
| 4,679,197 | 7/1987 | Hsu | 372/2 |
| 4,864,575 | 9/1989 | Ahern et al. | 372/2 |
| 4,893,103 | 1/1990 | Leupold | 335/216 |
| 4,918,049 | 4/1990 | Cohn et al. | 505/1 |
| 4,971,945 | 11/1990 | Takemura | 372/2 |
| 5,048,025 | 9/1991 | Takemura | 372/2 |
| 5,190,911 | 3/1993 | Takemura | 372/2 |
| 5,245,621 | 9/1993 | Leupold | 372/2 |

*Primary Examiner*—Leon Scott, Jr
*Attorney, Agent, or Firm*—Stanton E. Collier; Jacob N. Erlich

[57] ABSTRACT

The free electron laser wiggler has therein a device for generating a variable short period wiggler field. A Type II superconducting material is formed into a field modifying means having a channel therein through which a beam of free electrons travels. The field modifying means is held within a vacuum chamber further having a source of external magnetic fields therein and a cooling means therein. The magnetic field generated must fall within the upper and lower critical magnetic field of the Type II superconducting material. The magnetic field penetrates the superconducting material generating a mixed state of superconducting and normal regions. The amplitude and period of the wiggler field in this structure can be controlled by varying the temperature, applied magnetic field, and the impurity concentration in the superconducting material to affect the fluxoid lattice. The electron beam interacting with this wiggler field outputs short wavelength radiation.

9 Claims, 1 Drawing Sheet

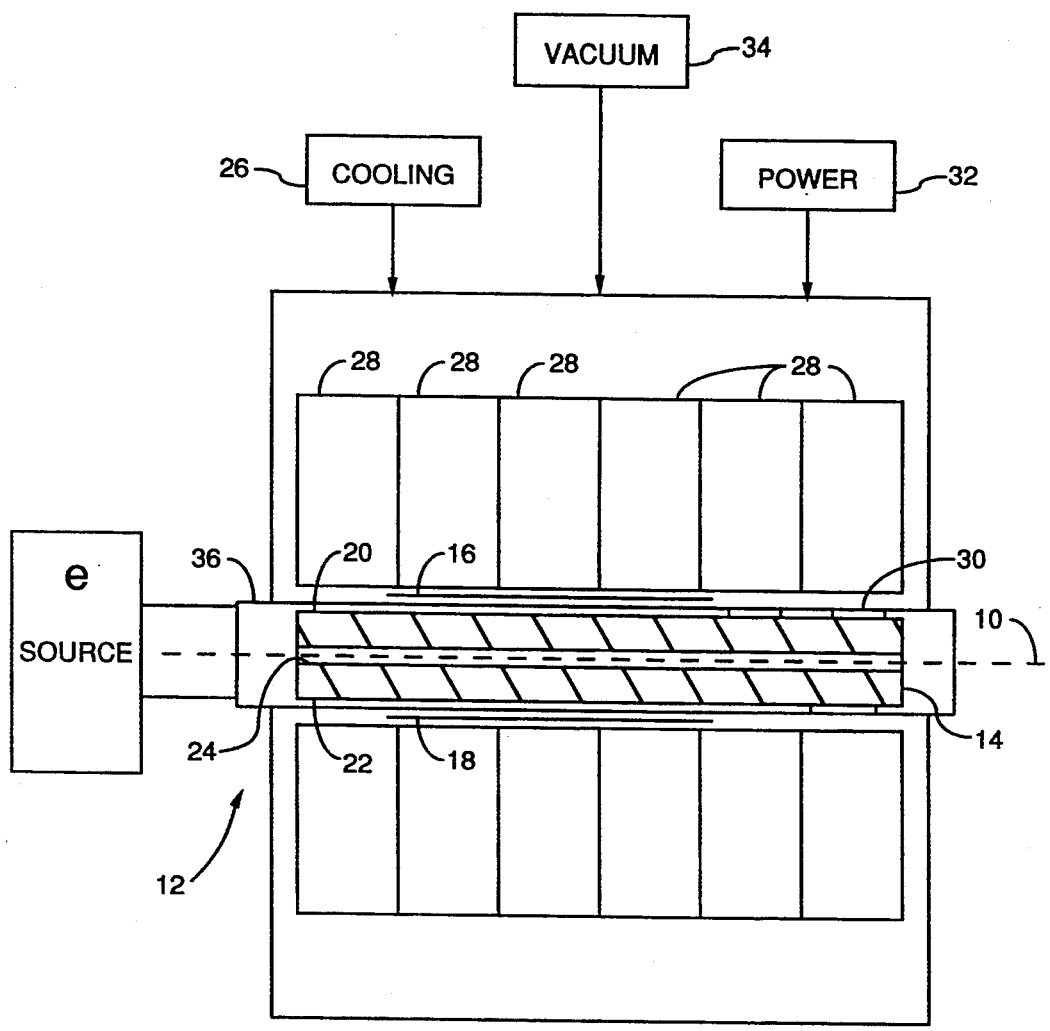

VARIABLE SHORT PERIOD ELECTRON BEAM WIGGLER FOR FREE ELECTRON LASERS

STATEMENT OF GOVERNMENT INTEREST

The invention described herein may be manufactured and used by or for the Government for governmental purposes without the payment of any royalty thereon.

BACKGROUND OF THE INVENTION

The present invention relates to lasers, and, in particular, relates to free electron lasers, and, in greater particularity, relates to wigglers used therein to modulate the free electron beam flowing therethrough.

In a free-electron laser (FEL), an electron beam is passed through a periodic magnetic field created by a device called a wiggler. The interaction with the magnetic field induces a transverse velocity modulation on the electron beam. The velocity modulation interacts with a radiation field to produce a ponderomotive force which drives a density modulation on the electron beam which can produce radiation which is in phase with the initial radiation field. The wavelength of the radiation thus generated is proportional to the wiggler period and inversely proportional to the square of the relativistic factor. The wiggler is a critical element in the FEL design.

Present magnetic wigglers/undulators use a configuration of permanent magnets or current carrying coils to produce the desired periodic spatial variation in the magnetic fields. Conventional wigglers typically have periods on the order of centimeters or tenths of centimeters. Furthermore, the field strength of the wiggler amplitude is severely limited as the wiggler period decreases because of constraints imposed by the materials and the configuration. It is difficult to vary the period of conventional wigglers because this necessitates reconstruction of the wiggler. Conventional wigglers, however, can have the amplitude of the magnetic field variation changed readily since, for those wigglers constructed using a number of current carrying coils, the coil current can be individually controlled.

Examples of prior art wigglers are shown in U.S. Pat. Nos. 4,893,103; 4,864,575; 4,679,197; 4,599,724; 4,542,510; and 4,438,513. For example, in U.S. Pat. No. 4,893,103 a plurality of magnetic rings are formed having opposing field direction from one ring to the next. Superconducting sheets are placed on these rings to modify the fields therein. The electron beam is sent down the middle of the rings and interacts with the periodic field established. The period of this field can not be changed without major modification to the wiggler structure. In U.S. Pat. No. 4,864,575 a periodic magnetic or electric field is established by a plurality of conducting layers separated by insulating layers and appropriately connected to provide either an electric or magnetic field. The electron beam is sent down a hole running perpendicular to the sheets. Multiple holes are provided. Because of the thin sheets, micron wavelength radiation is possible therefrom. The wavelength is not variable without major structural change. U.S. Pat. No. 4,438,513 provides a tunable radiation source without further detailing of the magnetic field.

Therefore there exists a need for a wiggler having a variable short period magnetic field structure.

SUMMARY OF THE INVENTION

The present invention is a device for generating a variable short period wiggler field. A Type II superconducting material is formed into a field modifying means having a channel therein through which a beam of free electrons travels. The field modifying means is held within a vacuum chamber further having a source of magnetic fields and a cooling means therein. The magnetic field generated must fall within the upper and lower critical magnetic field of the Type II superconducting material. The magnetic field penetrates the superconducting material generating a mixed state of superconducting and normal regions. The amplitude and period of the magnetic field in this structure can be controlled by varying the temperature, applied magnetic field, and the impurity concentration in the superconducting material.

Therefore one object of the present invention is to provide a wiggler having a variable periodic field.

Another object of the present invention is to provide a wiggler having a periodic field substantially smaller than conventional wigglers.

Another object of the present invention is to provide a wiggler having substantially higher magnetic field strengths.

Another object of the present invention is to provide a wiggler for use in a FEL capable of outputting coherent electromagnetic radiation in the x-ray spectrum.

Another object of the present invention is to provide an undulator for the production synchrotron radiation.

These and many other objects and advantages of the present invention will be readily apparent to one skilled in the pertinent art from the following detailed description of a preferred embodiment of the invention and the related drawings.

BRIEF DESCRIPTION OF THE DRAWINGS

The only FIGURE illustrates schematically the wiggler of the present invention.

DETAILED DESCRIPTION OF THE PREFERRED EMBODIMENT

Referring to the only FIGURE, a free-electron laser (FEL), not shown, passes an electron beam 10 through a periodic magnetic field created by a device called a wiggler 12. The interaction between the electron beam 10 and the magnetic field induces a transverse velocity modulation on the electron beam 10. The velocity modulation interacts with a radiation field to produce a ponderomotive force which drives a density modulation on the electron beam 10 which can produce radiation which is in phase with the initial radiation field. The wavelength of the radiation thus generated is proportional to the wiggler period and inversely proportional to the square of the relativistic factor. The periodic magnetic field is generated when the imposed external magnetic field enters the Type II superconductor device 14 creating a fluxoid lattice.

Previous wigglers and related devices are noted in U.S. Pat. Nos. 4,918,049; 4,893,103; 4,864,575; 4,679,197; 4,599,724; 4,542,510 and 4,438,513 which are incorporated by reference.

In Type II superconductors immersed in a magnetic field between the lower critical field and the upper critical field, it is energetically favorable for the magnetic field to penetrate the superconductor. The penetrated magnetic flux has been demonstrated to be quantized in units of $$hc/2e = 2.07 \times 10^{-7} \text{ gauss-cm}^2$$

where h is Planck's, c is the speed of light, and e is the elementary charge. A quantum of magnetic flux is called a fluxoid. For uniform external magnetic fields penetrating a homogeneous slab of Type II superconductor, the supercurrent vortices surrounding the fluxoids are organized in a periodic two-dimensional triangular lattices with hexagonal symmetry. The flux is uniform along the direction of the magnetic field. The periodic nature of the magnetic field continues for a distance outside the superconductor which is comparable to the separation of the fluxoids inside the superconductor device 14.

The nature of magnetic field interaction with superconducting material can be described in terms of two characteristic lengths: the coherence length and the penetration depth. The coherence length is a measure of the structure of the core of the fluxoid, and the penetration depth is a measure of the distance from the fluxoid core over which the magnetic field varies. When the applied magnetic fields are slightly higher than the lower critical field (where flux penetration first appears), a single fluxoid exists in the superconductor. At higher values of magnetic field, a periodic array of fluxoids forms in the superconductor which move progressively closer together (shorter period) with increasing magnetic field until the fluxoid spacing is comparable to the coherence length at the upper critical field after which higher applied magnetic field destroys the superconducting state. The hexagonal packing in the lattice of the fluxoids minimizes the free energy of the system.

The penetration depth and the coherence length are both temperature dependent. In addition, the coherence length and the penetration depth are affected by the concentration of impurities in the superconductor—in the "dirty limit" of high impurity concentration, the coherence length and the penetration depth are determined by the mean free path of the electrons in the normal material.

Since the structure of the fluxoid lattice depends, in addition to the magnetic field strength, on the coherence length and the penetration depth, and these characteristic lengths depend on the temperature and impurity concentration, varying the magnetic field, temperature, and tailoring the impurity concentration allows a fine degree of control over the fluxoid lattice and therefore over the wiggler field generated by the wiggler 12.

In a wiggler, a transverse beam displacement is caused by deflection of the electron trajectories in an average magnetic field with a preferential orientation. This can be corrected with a transverse electric field being parallel to the surface of the superconductor so that the resulting restoring force counteracts the electron deflection. The desired value of the electric field is $E = c<B>$, in mks units, where the brackets denote a spatial average. In the FIGURE, plates 16 and 18 can provide this force when properly charged.

Another method to correct this deflection is the use of a magnetic field imposed on the superconductor which alternates in direction along the electron beam path. If the beam deflection problem is not solved, the interaction region of the electron beam with the magnetic field must be much smaller than the radius of an electron orbit in an average magnetic field.

As seen in the FIGURE, a first and second layer 20 and 22 of superconducting material are located about a vacuum gap 24 which allows transit of the electron beam 10. The superconducting material may be fabricated with a variation of impurities in the material in such a manner as to produce a spatially varying electron mean free path in the material. This allows the coherence length and the penetration depth to be tailored for optimum performance.

A means for cooling 26 controls the temperature of the superconductor device 14. Typically, this will consist of: a) a double cryostat with superinsulation between the cryostats, b) a refrigeration apparatus to cool, maintain, and monitor the temperature of the superconductor, and (optionally) c) several different temperature heat sinks/sources to apply thermal gradients to the superconductor in order to spatially vary the temperature along the electron beam path.

A plurality of permanent magnets and/or current carrying coils 28 impose an external magnetic field on the superconductor device 14. The magnetic field imposed must be higher than the lower critical field and lower than the upper critical field of the Type II superconducting material. The use of current carrying coils 28 enable control of the magnetic field imposed on the superconductor, and allows the periodicity of the magnetic field which penetrates the superconductor to be spatially varied. In particular, a taper in the magnetic field period could be produced by this method wherein at one end the field strength is lower than at the other end. The use of the wiggler period tapering could allow substantial improvement in the efficiency of radiation production.

The gap 24 between the layers 20 and 22 of superconductor device 14 may be adjusted by means of an adjuster 30 so that the interaction region can be optimized.

A power means 32 monitors and adjusts the currents to each of the coils 28 which create the external magnetic field.

A vacuum means 34 is connected to a vacuum vessel 36 which allows the creation and maintenance of a low pressure necessary for the electron beam 10 to propagate through the device 14.

In conjunction with the cooling means 26, a gradient cooling means 38 may adjust and maintain temperature gradients in the superconductor layers 20 and 22 which further allows the fine tuning of the structure of the magnetic field within the gap.

In order to increase the applied magnetic field, superconducting coils without pole pieces can be used to generate the magnetic field. This allows the generation of higher magnetic fields than can be created with conventional coils and pole pieces, especially considering the need to maintain very low temperatures inside the cryostat containing the superconductors.

Although the above embodiment shows the use of two layers of superconducting material, one layer of such would allow the electron beam to skim over the surface rather than passing the electron beam through a gap between two pieces of superconductor.

Clearly, many modifications and variations of the present invention are possible in light of the above teachings and it is therefore understood, that within the inventive scope of the inventive concept, the invention may be practiced otherwise than specifically claimed.

What is claimed is:

1. A wiggler, said wiggler for use in a free electron laser, said wiggler operating on an input electron beam from said free electron laser, said wiggler comprising:

a Type II superconducting material device, said Type II superconducting material device receiving said electron beam, said Type II superconducting material device interacting by means of magnetic fields with said electron beam by means of fluxoid lattices having a magnetic field of variable period generated by an external magnetic field, said external magnetic field having a field strength less than an upper critical magnetic field and greater than a lower critical magnetic field, said electron beam interacting with said magnetic field of said fluxoid lattices outputting laser radiation of a wavelength as determined by the fluxoid lattice, said wavelength of said laser radiation being proportional to a period of said wiggler, said Type II superconducting material device having a longitudinal axis;

a means of drawing a vacuum about said Type II superconducting material device;

a means for cooling said Type II superconducting material device to at least a temperature to make said device superconducting;

a means for generating said external magnetic field, said means for generating said external magnetic field being positioned longitudinally about said longitudinal axis of said Type II superconducting material device, said external magnetic field being parallel said longitudinal axis of said Type II superconducting material device, said means for generating said external magnetic field being able to change the field strength along said longitudinal axis; and a means for powering said means for generating said external magnetic field.

2. A wiggler as defined in claim 1 wherein said Type II superconducting device has at least one layer of superconducting material therein, said electron beam being placed in close proximity to said one layer.

3. A wiggler as defined in claim 2 wherein said device has two layers of superconducting material, a channel for said electron beam positioned between said two layers.

4. A wiggler as defined in claim 3 further including means for adjusting a size of said channel.

5. A wiggler as defined in claim 1 further including means for imposing an electrical field on said electron beam, said means receiving power from said means for powering.

6. A wiggler as defined in claim 1 further including means for adjusting a temperature gradient along said longitudional axis of said Type II superconducting device, 7. A wiggler as defined in claim 1 wherein said means for generating said external magnetic field are a plurality of coils being driven by said means for powering.

8. A wiggler as defined in claim 7 wherein said coils are superconducting,

9. A wiggler as defined in claim 1 wherein said means for generating said external magnetic field are a plurality of magnets.

* * * * *